US006646258B2

(12) United States Patent
Russ, IV

(10) Patent No.: US 6,646,258 B2
(45) Date of Patent: Nov. 11, 2003

(54) CONCAVE ELECTRODE ION PIPE

(75) Inventor: Charles William Russ, IV, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 340 days.

(21) Appl. No.: 09/766,701

(22) Filed: Jan. 22, 2001

(65) Prior Publication Data

US 2002/0096630 A1 Jul. 25, 2002

(51) Int. Cl.[7] .......................... B01D 59/44; H01J 49/00
(52) U.S. Cl. ........................ 250/292; 250/288; 250/282
(58) Field of Search ................................ 250/288, 292, 250/282

(56) References Cited

U.S. PATENT DOCUMENTS

| | | | | |
|---|---|---|---|---|
| 3,648,046 A | * | 3/1972 | Denison et al. | |
| 4,542,293 A | | 9/1985 | Fenn et al. | 250/288 |
| 4,963,736 A | | 10/1990 | Douglas et al. | 250/292 |
| 5,652,427 A | | 7/1997 | Whitehouse et al. | 250/288 |
| 5,708,268 A | | 1/1998 | Franzen | 250/292 |
| 5,847,386 A | | 12/1998 | Thomson et al. | 250/288 |
| 5,962,851 A | * | 10/1999 | Whitehouse et al. | 250/288 |
| 6,020,586 A | * | 2/2000 | Dresch et al. | 250/287 |
| 6,157,031 A | | 12/2000 | Prestage | 250/292 |

FOREIGN PATENT DOCUMENTS

| | | | |
|---|---|---|---|
| EP | 0488746 B1 | 11/1991 | H01J/49/42 |

OTHER PUBLICATIONS

M. Szilágyi, "Electrostatic Multiple Lenses with Cylindrical Concave Electrodes", Optik, 46 (1976) No. 2, pp. 211–218.

G. Bosi, "Quadrupole Fields in Circular Concave Electrodes and Poles", Review Scientific Instruments, vol. 45, No. 10, Oct., 1974, pp. 1260–1262.

Tomonao Hayashi and Noriyuki Sakudo, "Quadrupole Field in Circular Concave Electrodes", The Review of Scientific Instruments, vol. 39, No. 7, Jul., 1968, pp. 958–961.

M. Szilágyi, "A Solution to the Problem of the Ideal Quadrupole Lens", Optik, 50 (1978) No. 2, pp. 121–128. Tavaszmezö utca 17, 1084 Budapest, Hungary.

* cited by examiner

*Primary Examiner*—Bruce Anderson
(74) *Attorney, Agent, or Firm*—Timothy H. Joyce

(57) ABSTRACT

An apparatus for delivering ions between vacuum stages. The apparatus includes a concave electrode ion pipe originating in a first vacuum stage and terminating in a second vacuum stage. The design of the concave electrode ion pipe provides for transport of ions over long distances without substantial loss of the ions while at the same time restricting overall gas flow. The invention allows for the elimination of vacuum stages or a reduction in vacuum pumping speed(s) if the same number of vacuum stages is employed.

57 Claims, 4 Drawing Sheets

CONCAVE ELECTRODE ION PIPE

TECHNICAL FIELD

This invention relates generally to mass spectrometry and particularly to a concave electrode ion pipe for transferring ions over long distances and between vacuum stages without significant ion loss.

BACKGROUND

Mass spectrometers have emerged as an important tool for analysis of biochemical samples, pesticides and organic compounds. They are highly sensitive instruments that have the capability of separating molecular ions according to a mass to charge ratio (m/z). A simple mass spectrometer includes three important components; the ionization source, mass filter and ion detector. Analytes may be introduced into the ionization source through a gas chromatograph, HPLC column or solid probe. In addition, since the ionization source, mass filter and ion detector are separated spatially, it becomes important to be able to move ions from place to place and chamber to chamber effectively and efficiently without loss of ions. In addition, it is quite often necessary to transfer ions between vacuum stages without significant ion loss.

Atmospheric pressure ion sources (API) including electrospray or nebulization assisted electrospray, atmospheric pressure chemical ionization (APCI), atomospheric pressure photo ionization (APPI), atmospheric pressure matrix-assisted laser desorption (AP MALDI) and inductively coupled plasma (ICP) have become increasingly popular and important for generating ions at atmospheric pressure in mass analysis. Various vacuum systems and associated electrostatic lenses have been extensively employed in these systems. Where there are several pumping stages maintained at $10^{-1}$ to $10^{-8}$ Torr, multipole ion guides have been employed. The use of multipole ion guides has been particularly important in transporting ions in vacuum or from one vacuum stage to another vacuum stage. A multipole ion guide can be designed to begin in one vacuum stage and extend contiguously through one or more additional vacuum stages of a multiple pumping stage system. In most cases when background pressure is high enough, the ions will scatter. The purpose then of the multipole ion guide is to prevent dispersions due to scattering. Ordinarily, significant loss of ions may occur when multiple stages are employed and ions must be moved from stage to stage. High ion transmission efficiency can be achieved by multiple vacuum pumping stages using multipole ion guides that have been configured to connect or extend between one or more vacuum stages. In practice, RF voltage is applied to the rods of a multipole guide, adjacent rods differing in phase by 180 degrees. The resulting electric field within the guide prevents ions from drifting too far from the axis of the guide, despite collisions of the ions with the background gas, and transmission of the ions is thereby enhanced. These ion guides, therefore, are effective in improving the performance of mass spectrometer systems by delivering more ions to the mass filter (analyzer). These ion guides, therefore, are effective in improving the performance of mass spectrometers. Examples of the types of mass spectrometer systems in which ion guides can be used include Time-of-Flight, Ion trap, FT-ICR, quadrupole, hybrid quadrupole/Time-of-Flight, orthogonal acceleration Time-of-Flight and magnetic sector. Ion sources that have been used for the various spectrometers incorporating ion guides include, for example, electrospray, atmospheric pressure chemical ionization, gas discharge, plasma and other sources that are known and used in the art.

In their simplest forms, RF multipole ion guides for ion transport in mass spectrometers are best illustrated in U.S. Pat. No. 4,963,736. These ion guides provide for transport of ions between vacuum stages or chambers. However, such ion guides may suffer from the disadvantage that many of the ions will not be transported, i.e. will contact the ion guide walls, and will fail to reach the exit end of the ion guide. Many ions will become "stalled out" if excessive background pressure is present. This is best exemplified in U.S. Pat. No. 5,847,386 that shows the effects on the ion diffusion or transport caused by the excessive background pressure in the ion guide. A high background pressure may be desirable for collisional focusing, but if the pressure is too high then the ions will undergo enough collisions with neutral atoms that they will no longer have significant axial kinetic energy to make it through the device in a practical time frame.

A number of techniques, designs and devices have been developed for avoiding this "stall-out" problem by re-accelerating the ions by application of an axial field. Efforts have been made to step DC potentials in ion guides to improve performance. This is accomplished by having a DC offset with each subsequent guide section such that the ions are reaccelerated by the field created in each transition region between the sections.

Mass spectrometers with these ion guides operated at high background pressure may not sufficiently limit the flow of gas to the mass filter. This can cause problems that lower overall performance in the instruments.

In a mass spectrometer system, it is necessary to limit the flow of gas to the mass filter. This is normally accomplished by one or more stages of flow restriction and pumping. Unfortunately, significant flow restriction limits the ion transmission efficiency that can be achieved; and insufficient flow restriction adds additional pumping stages or larger pumps that contribute to increased system cost and complexity.

It is, therefore, an object of the invention to provide an improved apparatus and method to serve as an ion pipe that can limit flow conductance and allow for the elimination of vacuum stages or use of lower speed pumps.

Another object of the invention is to provide a novel apparatus that will provide the ability to capture, focus and transport ions over a long distance without significant loss of ions and with significant gas flow reduction.

Another object of the invention is to provide a concave, segmented ion pipe for transporting ions over long distances that prevents ions from "stalling-out" between various instrument components of a mass spectrometer.

SUMMARY OF THE INVENTION

The invention includes a concave electrode ion pipe for delivering ions between vacuum stages. The concave electrode ion pipe includes a conduit having an axial bore that may connect at least two vacuum stages. The axial bore of the ion pipe defines a concave wall wherein the gas flows between the vacuum stages and the axial bore restricts the flow of gas. The concave wall is circumferentially segmented into electrodes to which are applied RF voltages alternating in phase between adjacent electrodes. The ion pipe may also be axially segmented in design and has the ability to carry ions over a long distance without substantial ion loss. The concave design of the pipe restricts the gas flow and allows for elimination of vacuum stages or application of lower speed pumps.

DETAILED DESCRIPTION OF A PREFERRED EMBODIMENT OF THE INVENTION

Although other applications for the invention are readily apparent to one of knowledge in the art, the exemplary use of the invention in a mass spectrometer is described herein because the unique and novel features of the invention are advantageous to the performance of such an instrument.

Figure 1A:
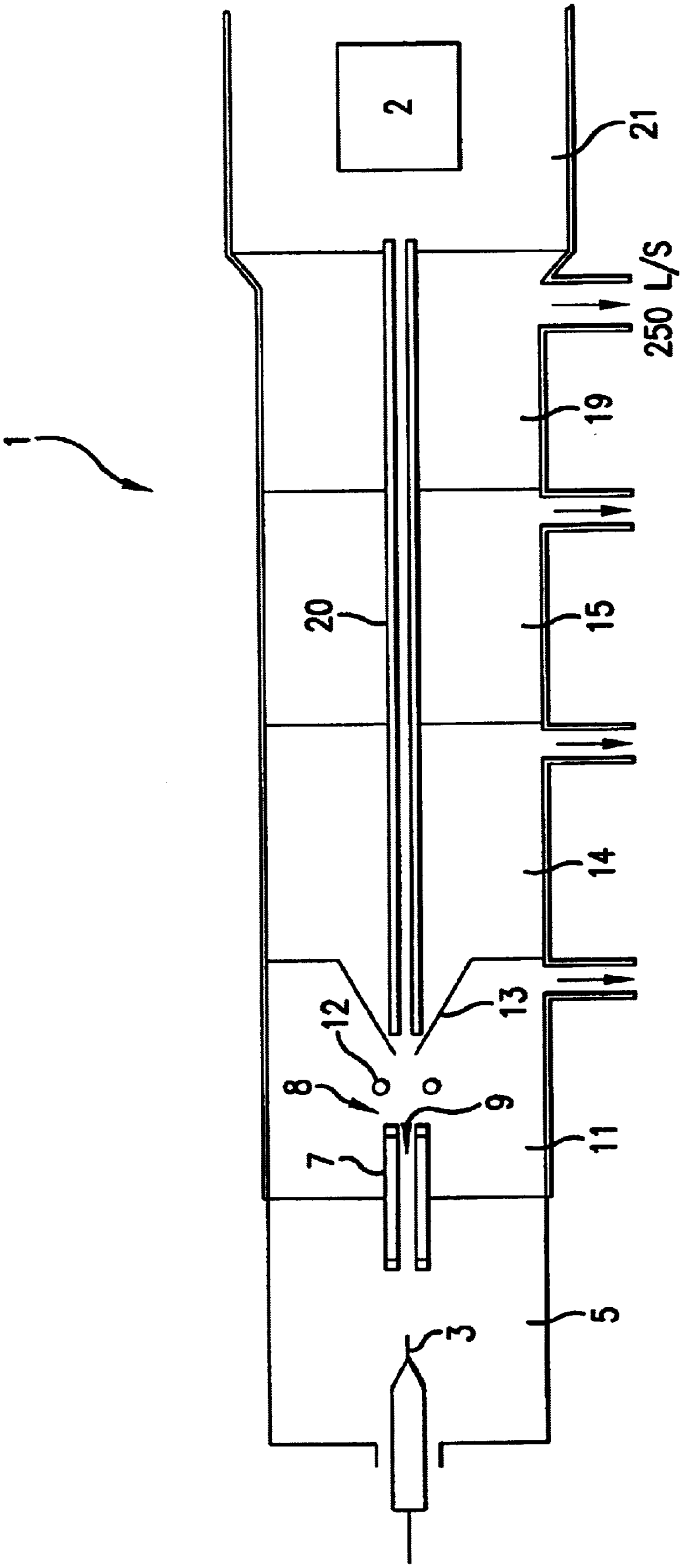
FIG. 1A is a diagram of a standard mass spectrometer using a connecting multipole or octapole between the first and fifth vacuum stages.

FIG. 1A shows a standard mass spectrometer 1 that includes five pumping stages (shown as consecutive reference numerals 11, 14, 15, 19 and 21) and a series of static voltage lenses used to focus the ions into a mass analyzer 2. The stages are pumped by means well known in the art, e.g., with diffusion or turbo pumps. In this standard type system the analyte solution is injected through needle 3 and is electrosprayed into a chamber 5. Charged analyte solution droplets are evaporated in the chamber 5 and desolvated ions are swept into capillary 7. The system is designed so that a portion of the ions and the gas are swept into the vacuum and capillary bore 9. The gas and entrained ions then pass through the capillary and into a first vacuum stage 11. The pressure of the first vacuum stage 11 is maintained between about 0.4 and 20 torr so that the gas exiting the capillary will expand. A number of different gases may be employed in these systems including nitrogen, carbon dioxide, oxygen and helium. An electrostatic field or series of fields may be employed at the exit end of the capillary 8. An optional ring lens 12 and skimmer 13 may be employed to electrostatically focus and accelerate ions into a multipole or octapole 20 which extends from the first vacuum stage 11, through the second vacuum stage 14, third vacuum stage 15, fourth vacuum stage 19 and ends at the fifth vacuum stage 21.

Second vacuum stage 14 is typically operated at a pressure ranging from between about 10 to 500 millitorr depending on the pumps used and their speeds as well as on the orifice size. The pressure in the third vacuum stage 15 is typically in the range of about $1\times10^{-3}$ to below about $1\times10^{-4}$ torr. Further electrostatic lenses may be applied to focus ions passing through a fourth vacuum stage 19 that has an attached pump that operates at a pumping speed of approximately 250 L/sec. Fourth vacuum stage 19 is typically maintained at a pressure ranging from between about $1\times10^{-4}$ to about $1\times10^{-6}$ torr and leads into a final fifth vacuum stage 21 which houses the mass analyzer 2. The fifth vacuum stage 21 is maintained at a pressure lower than or equal to $2\times10^{-7}$ torr. The mass analyzer 2 may be any of the mass analyzers well known in the art. For example, a Time of Flight mass analyzer may be used to separate ions transmitted from the multipole/octapole 20 shown in the diagram 1A or from the concave electrode ion pipe 31 shown in FIGS. 1B and 1C.

Figure 1B:
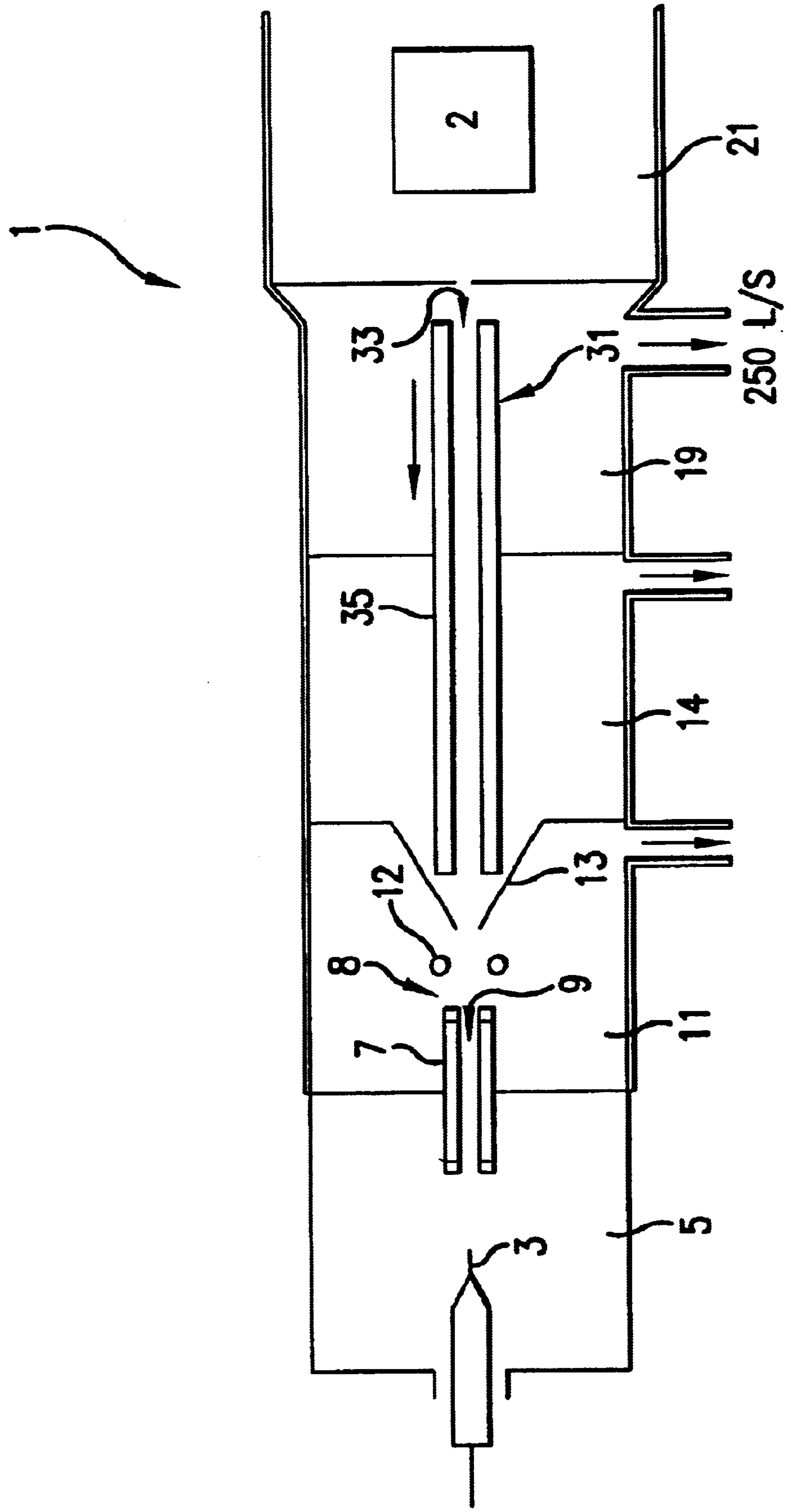
FIGS. 1B is similar to 1A, but includes the present invention and omission of the third vacuum stage shown in FIG. 1A.
Figure 1C:
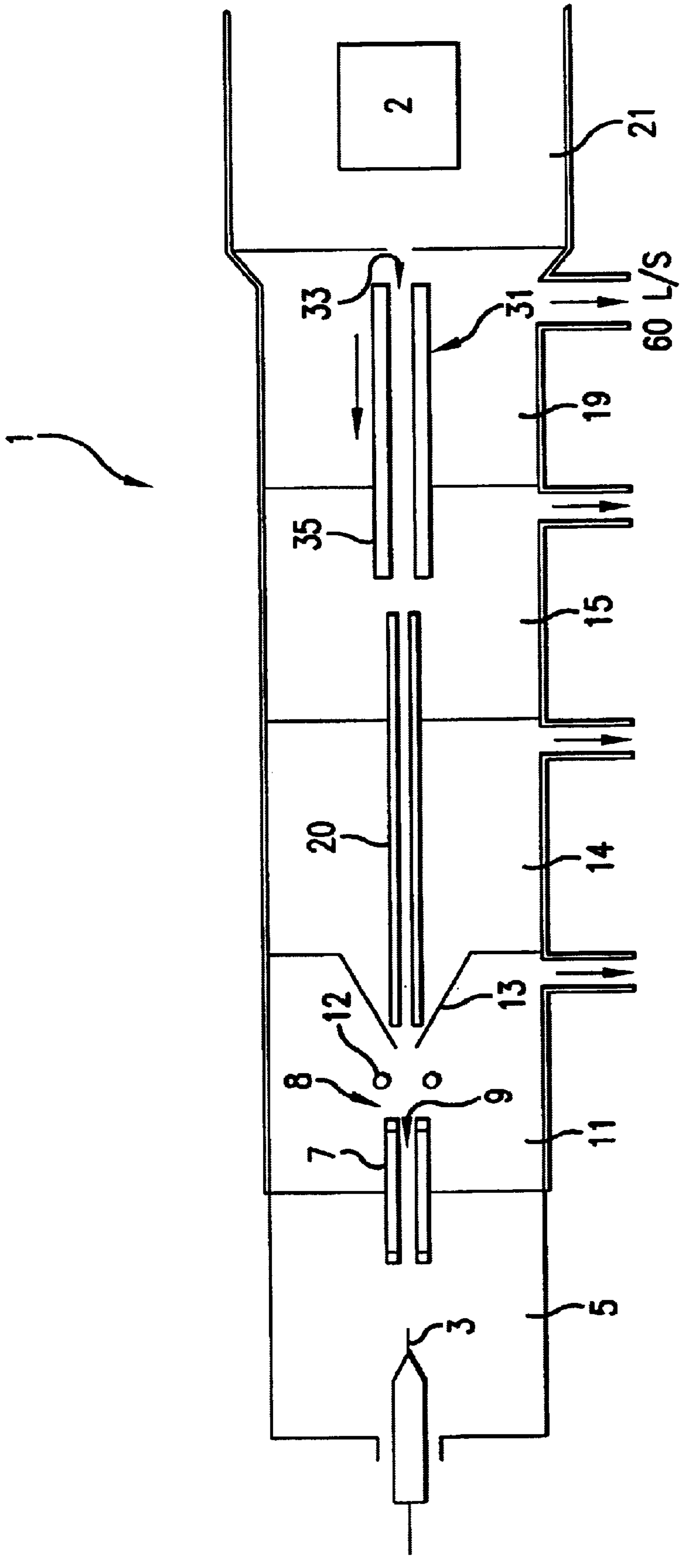
FIGS. 1C is similar to 1A, but includes the use of both a multipole or octapole and the present invention.

The application of the present invention and its operation is best exemplified in FIGS. 1B and 1C. The drawings are used for representation purposes only and are not drawn to scale.

FIG. 1B shows a similar device to FIG. 1A, with the invention connecting the first vacuum stage 11 to the fourth vacuum stage 19. The invention provides the advantage that the third vacuum stage 15 may be omitted while the pump in the fourth vacuum stage 19 may be maintained at a pressure of about $10^{-5}$ torr using a pump with speed around 250 liters/sec (the same pump speed and pressure shown in FIG. 1A, but one less stage is needed). The invention's novelty allows the manufacturer the ability to omit stages. This provides a significant advantage over other arrangements well known in the art.

FIG. 1C shows the application of the present invention with both the multipole/octapole 20 and the invention or concave electrode ion pipe 31. In this case scenario, stages 1–5 are employed as in FIG. 1A (the third stage 15 has not been omitted). However, when the multipole/octapole 20 is used in combination with the invention or concave electrode ion pipe 31, the fourth stage 19 will allow a significantly lower pump speed (i.e. down to 60 liters/sec from 250 liters/sec) to produce the same vacuum in the standard mass spectrometer shown in FIG. 1A. The ability to use lower speed pumps with the same number of vacuum pumping stages provides for another significant advantage of the present invention over the art.

Figure 2:
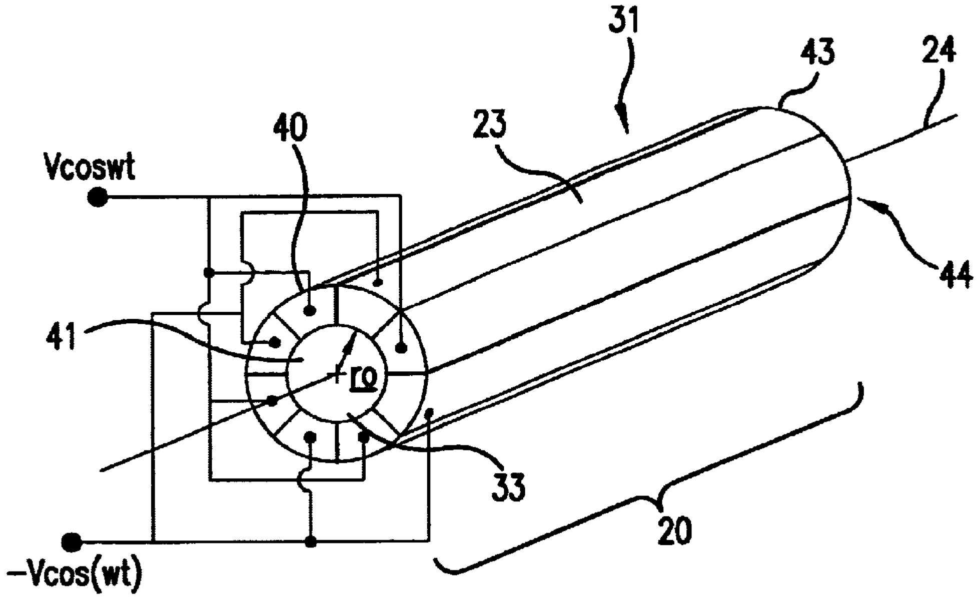
FIG. 2 is a first embodiment of the invention.
Figure 3:
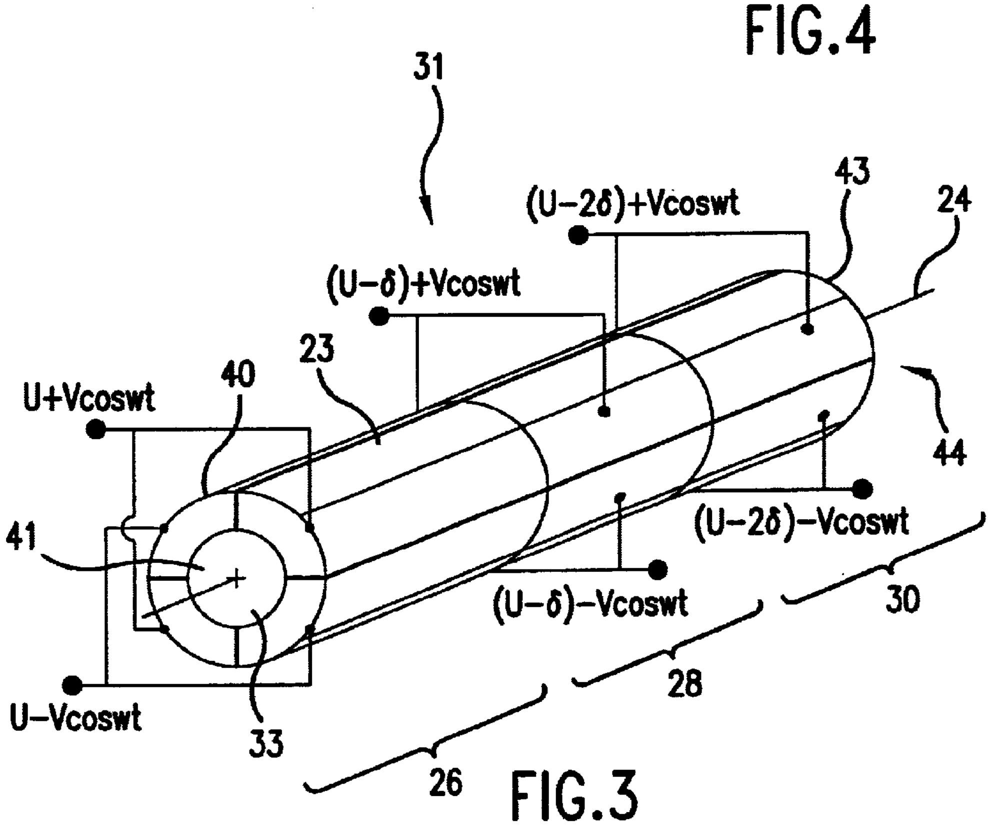
FIG. 3 is a second embodiment of the invention showing an axial segmented ion pipe.

A cross section of a first and second embodiment of a concave electrode ion pipe 31 is shown in FIGS. 2 and 3.

Referring to FIG. 2, the concave electrode ion pipe 31 assembly consists of a set of e.g. four, six or eight or more parallel, concave electrodes 23. An embodiment with eight electrodes is shown. The electrodes 23 are equally spaced about a longitudinal axis. 24. The electrodes are equally spaced and shaped to have a concave curvature; concave toward the axis. A means is used for applying a voltage to the electrodes of the present invention. The means may include any devices and power supplies that are well known in the art. An RF voltage $V\cos\omega t$ of amplitude V and frequency $\omega/27\pi$ is applied to the electrodes 23, with alternate electrodes having equal amplitude and opposite phase, as illustrated in FIG. 2. If the concave electrode ion pipe has four electrodes, it can optionally be operated as a mass filter by applying voltages of $U+V\cos\omega t$ and $-[U+V\cos\omega t]$ to alternate electrodes as is well known in the art for quadrupole mass filters. In that embodiment of the invention, U is a DC voltage. U, V and ω are chosen for given pipe dimensions and mass to charge ratio ranges in the manner commonly known in the art of quadrupole mass filters. In the RF-only embodiment, typical ranges are about 10 Volts to about 1000 Volts for V and about 100 kHz to about 15 mHz for $\omega/2\pi$. These ranges apply to ion pipes with 4, 6, 8 or more electrodes.

Referring to FIG. 2, the concave electrode ion pipe 31 comprises a conduit 33 having conduit wall 35 (note: the conduit wall is shown and labeled in FIGS. 1B–C). The wall 35 is designed in a concave shape. The concave shape of the wall 35 enables the confinement and transfer of ions between vacuum stages while at the same time serving as a flow conductance limiting channel. The length of an ion pipe is typically about 0.5 cm to about 30 cm, although other lengths could be used, depending upon the application. The concave electrode ion pipe 31 is designed so that conduit 33 has an inlet end 40 with an inlet opening 41, conduit 33 and an exit end 43 with outlet opening 44 opposite the inlet end 40. The concave inner diameter of the concave electrode ion pipe 31 is reduced in size so as to minimize the gas flow between the vacuum stages without compromising the ion transmission. The effective inner diameter for the concave electrode ion pipe 31 is typically 2.5 millimeters or less, but may be larger if higher gas flow is acceptable. Calculation of the gas conductance from the inner diameter and length is by equations well known in the art. The concave electrode ion pipe 31 is designed in a concave geometry that sets a prescribed limit on the volume of gas that may pass from vacuum stage to vacuum stage. This concave electrode ion pipe 31 geometry places an upper bounds on the cross section of the ion beam that can exit the concave electrode ion pipe 31. Concave electrode ion pipe 31 can be used with a variety of mass spectrometers. For instance, use can be made with API Time of Flight or quadrupole mass spectrometers. This also includes other spectrometers and sources that are well known and used in the art. Concave electrode ion pipe 31 also has the flexibility of being applied to bridge other vacuum chambers. In other words, concave electrode ion pipe 31 has the capability of being mounted to connect any number of the vacuum pumping stages 11, 14, 15 and 19. However, an advantage of the invention is that the concave electrode ion pipe 31 provides for the elimination of stages and can reduce the overall pumping needs and demands. There is no particular orientation or method of mounting of the present invention or ion pipe. A variety of orientations and methods may be used that are readily available and known in the art, with due consideration for electrical isolation and gas flow restriction requirements.

FIG. 3 shows a diagram of an embodiment of the present invention with extended segmentation. The figure shows an example of the embodiment with four concave electrodes (in each segment), but six, eight, or more electrodes could be used as well. A description will now follow regarding the effects on the positive ions that are conducted and transmitted by the present invention. However, it should be kept in mind that the actual application of the techniques can also be applied to negative ions through techniques that are well known and established in the art. The segments are shown in the diagram as sections 26, 28 and 30, and are designed for moving ions along the axis 24. This is accomplished by establishing axial DC electric fields within the conduit 33. The ions enter the inlet opening 41 at the inlet end 40 and are moved toward exit opening 44 at the exit end 43. The concave design of the concave electrode ion pipe limits the gas flow. In addition, by applying steps of decreasing DC voltage (for positive ions; increasing for negative ions) on the sections 26, 28 and 30, as illustrated for one exemplary set of voltages in FIG. 3, the ions can be moved from one end to the other.

Figure 4:
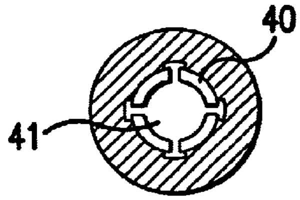
FIG. 4 is a cross section of the concave electrode ion pipe taken along the arrow shown in FIGS. 1B–1C.

FIG. 4 shows a cross section of a concave electrode ion pipe taken along the arrow shown in FIGS. 1B–1C. The Figure shows how the cross-section of the ion pipe may be designed. The concave electrode ion pipe may be radially sealed to prevent gas flow in two directions. FIG. 4, in particular, shows the design of the concave electrode ion pipe and how each of the electrodes 23 engage to form the concave conduit. The concave electrode ion pipe 31 may comprise electrodes 23 that form one section 20 (See FIG. 2). As shown in FIG. 3, or a second embodiment of the invention, the concave electrode ion pipe 31 may also include a variety of segments 26, 28 and 30. The segments 26, 28 and 30 are useful in assisting the transport of ions from inlet end 40 to exit end 43, as described above. A variety of embodiments are possible with the purpose of improving movement of ions over various distances. The concave design of the present invention provides for significant improvements over the prior art. For instance, it can be said that the conductance C of the pipe is proportional to the diameter D of the pipe squared divided by the length L that the ions must pass. Keeping this in mind the invention allows improved ion transport. For instance, if one keeps D the diameter of the pipe at a constant and the conductance C is reduced, there are lower vacuum requirements on the system. Also, if the conductance C is fixed, the diameter D may be increased to get better ion transmission that significantly improves over other devices well known in the art.

Clearly, minor changes may be made in the form and construction of the invention without departing from the scope of the invention defined by the appended claims. It is not, however, desired to confine the invention to the exact form herein shown and described, but it is desired to include all such as properly come within the scope claimed.

I claim:

1. An apparatus for analyzing chemical species, comprising:

(a) an ion source for operation at substantially atmospheric pressure to produce ions from a sample;

(b) at least two vacuum stages, the first vacuum stage of said vacuum stages being in communication with said ion source such that said ions produced by said ion source can move out of said ion source and into said first vacuum stage, said vacuum stages being in communication with each other such that said ions can move through a sequence of said vacuum stages;

(c) a mass analyzer and detector located in at least one of said vacuum stages;

(d) an concave electrode Ion pipe designed for restricting gas flow and having a plurality of electrodes, said concave electrode ion pipe being located in a plurality of said vacuum stages such that said ion pipe begins in one of said vacuum stages and extends into at least one subsequent vacuum stage in said sequence of vacuum stages, thereby limiting gas flow through said ion pipe without compromising ion transmission; and (e) means for applying electrical voltages to said electrodes of said concave electrode ion pipe.

2. An apparatus as recited in claim 1, wherein said ion source is an electrospray ion source.

3. An apparatus as recited in claim 1, wherein said ion source is an Atmospheric Pressure Chemical Ionization source.

4. An apparatus as recited in claim 1, wherein said ion source is a plasma ion source.

5. An apparatus as recited in claim 1, wherein said concave electrode ion pipe has six electrodes.

6. An apparatus as recited in claim 1, wherein said concave electrode ion pipe has four electrodes.

7. An apparatus as recited in claim 1, wherein said concave electrode ion pipe has eight electrodes.

8. An apparatus as recited in claim 1, wherein said mass analyzer is a magnetic sector mass analyzer.

9. An apparatus as recited in claim 1, wherein said mass analyzer is a Time-of-Flight mass spectrometer.

10. An apparatus as recited in claim 9, wherein said Time-of-Flight mass spectrometer comprises an orthogonal acceleration Time-of-Flight mass spectrometer.

11. An apparatus as recited in claim 1, wherein said mass analyzer comprises a quadrupole mass filter.

12. An apparatus as recited in claim 1, wherein said mass analyzer comprises a hybrid quadrupole-Time-of-Flight mass spectrometer.

13. An apparatus as recited in claim 1, wherein said mass analyzer comprises an ion trap mass spectrometer.

14. An apparatus as recited in claim 1, wherein said mass analyzer comprises a Fourier Transform ion cyclotron resonance mass spectrometer.

15. An apparatus as recited in claim 1, comprising three of said vacuum stages.

16. An apparatus as recited in claim 1, comprising four of said vacuum stages.

17. An apparatus as recited in claim 1, comprising more than four of said vacuum stages.

18. An apparatus as recited in claim 1, wherein said concave electrode ion pipe extends continuously through said vacuum stages.

19. An apparatus as recited in claim 1, wherein said apparatus comprises at least three vacuum stages, and wherein said concave electrode ion pipe begins in the second vacuum stage of said vacuum stages and extends continuously into the third vacuum stage of said vacuum stages.

20. An apparatus as recited in claim 1, wherein said concave electrode ion pipe begins in a second vacuum stage.

21. An apparatus as recited in claim 1, wherein said electrical voltages are RF voltages.

22. An apparatus as recited in claim 1, wherein said electrical voltages are RF and DC voltages.

23. An apparatus for analyzing chemical species, comprising:

(a) an ion source for operation at substantially atmospheric pressure to produce ions front a sample;

(b) at least two vacuum stages, the first vacuum stage of said vacuum stages being in communication with said ion source such that said ions produced by said ion source can move out of said ion source and into said first vacuum stage, said vacuum stages being in communication with each other such that said ions can move through a sequence of said vacuum stages;

(c) a Time-of-Flight mass analyzer and detector each located in at least one of said vacuum stages;

(d) at least one concave electrode ion pipe designed for restricting gas flow and having a plurality of electrodes, said concave electrode ion pipe being located in at least one of said vacuum stages, thereby limiting gas flow through said ion pipe without compromising ion transmission; and (e) means for applying electrical voltages to said electrodes of said concave electrode ion pipe.

24. An apparatus as recited in claim 23, wherein said ion source is an electrospray ion source.

25. An apparatus as recited in claim 23, wherein said ion source is an Atmospheric Pressure Chemical Ionization source.

26. An apparatus as recited in claim 23, wherein said ion source is a plasma ion source.

27. A method for analyzing chemical species comprising:

(a) utilizing an ion source, a vacuum system with at least two vacuum stages, a mass spectrometer and detector, and a concave electrode ion pipe that is designed for restricting gas flow and which has a plurality of electrodes located in a plurality of said vacuum stages such that said concave electrode ion pipe begins in one of said vacuum stages and extends into at least one subsequent vacuum stage in said vacuum system for limiting gas flow through said ion pipe without comprising ion transmission;

(b) producing ions from a sample substance using said ion source;

(c) directing said ions into said electrode ion pipe having electrical voltages applied to said electrodes of said concave electrode ion pipe;

(d) directing said ions from one of said vacuum stages of said vacuum system into at least one subsequent vacuum stage in said vacuum system while said ions are in said concave electrode ion pipe; and (e) transferring said ions through said concave electrode ion pipe and into said mass spectrometer and detector for mass analysis of said ions.

28. A method according to claim 27, wherein said step of producing said ions is accomplished at substantially atmospheric pressure.

29. A method according to claim 27, wherein said sample introduced into said ion source is a solution.

30. A method according to claim 27, wherein said electrical voltages applied to said concave electrode ion pipe comprise RF and DC components, said electrical voltages comprising RF and DC components being set to limit the m/z range of said ions which will pass through said concave electrode ion pipe.

31. A method according to claim 27, wherein said mass analysis is conducted with a quadrupole mass analyzer.

32. A method according to claim 27, wherein said mass analysis is conducted with a magnetic sector mass analyzer.

33. A method according to claim 27, wherein said mass analysis is conducted with a Time-of-Flight mass analyzer.

34. A method according to claim 27, wherein said mass analysis is conducted with an ion trap mass analyzer.

35. A method according to claim 27, wherein said mass analysis is conducted with a Fourier Transform ion cyclotron resonance mass analyzer.

36. An apparatus for analyzing chemical species, comprising:

(a) an ion source for operation at substantially atmospheric pressure to produce ions from a sample;

(b) at least two vacuum stages, the first vacuum stage of said vacuum stages being in communication with said ion source such that said ions produced by said ion source can move out of said ion source and into said first vacuum stage, said vacuum stages being in communication with each other such that said ions can move through a sequence of said vacuum stages;

(c) a mass analyzer and detector located in at least one of said vacuum stages;

(d) an electrode ion pipe for restricting gas flow and having a central longitudinal axis and a plurality of electrodes extending along said axis, each of said electrodes having a concave surface facing said axis, said electrode ion pipe being located in a plurality of said vacuum stages such that said ion pipe begins in one of said vacuum stages and extends into at least one subsequent vacuum stage in said sequence of vacuum stages, thereby limiting gas flow through said ion pipe without compromising ion transmission; and (e) means for applying electrical voltages to said electrodes of said electrode ion pipe.

37. An apparatus as recited in claim 36, wherein said electrode ion pipe has six electrodes.

38. An apparatus as recited in claim 36, wherein said electrode ion pipe has eight electrodes.

39. An apparatus as recited in claim 36, wherein said electrode ion pipe has eight electrodes.

40. An apparatus as recited in claim 36, wherein said electrode ion pipe extends continuously through said vacuum stages.

41. An apparatus as recited in claim 36, wherein said apparatus comprises at least three vacuum stages, and wherein said electrode ion pipe begins in the second vacuum stage of said vacuum stages and extends continuously into the third vacuum stage of said vacuum stages.

42. An apparatus as recited claim 36, wherein said electrode ion pipe begins in a second vacuum stage.

43. An apparatus as recited in 36, wherein said electrode ion pipe is longitudinally segmented.

44. Au apparatus for analyzing chemical species, comprising:

(a) an ion source for operation at substantially atmospheric pressure to produce ions from a sample;

(b) at least two vacuum stages, the first vacuum stage of said vacuum stages being in communication with said ion source such that said ions produced by said ion source can move out of said ion source and into said first vacuum stage, said vacuum stages being in communication with each other such that said ions can move through a sequence of said vacuum stages;

(c) a Time-of-Flight mass analyzer and detector each located in at least one of said vacuum stages;

(d) at least one electrode ion pipe for restricting gas flow and having a central longitudinal axis and a plurality of electrodes extending along said axis, each of said electrodes having a concave surface facing said axis, said electrode ion pipe being located in at least one of said vacuum stages, thereby limiting gas flow through said ion pipe without compromising ion transmission; and (e) means for applying electrical voltages to said electrodes of said electrode ion pipe.

45. An apparatus as recited in claim 44, wherein said ion source is an electrospray ion source.

46. An apparatus as recited in claim 44, wherein said ion source in an Atmospheric Pressure Chemical Ionization source.

47. An apparatus as recited in claim 44, wherein said ion source is a plasma ion source.

48. A method for analyzing chemical species comprising:

(a) utilizing an ion source, a vacuum system with at least two vacuum stages, a mass spectrometer and detector, and an electrode ion pipe that has a central longitudinal axis, and is designed for restricting gas flow and which has a plurality of electrodes located in a plurality of said vacuum stages such that said electrode ion pipe begins in one of said vacuum stages and extends into at least one subsequent vacuum stage in said vacuum system each of said electrodes having a concave surface facing said longitudinal axis, for limiting gas flow through said ion pipe without compromising ion transmission;

(b) producing ions from a sample substance using said ion source;

(c) directing said ions into said electrode ion pipe having electrical voltages applied to said electrodes of said electrode ion pipe;

(d) directing said ions from one of said vacuum stages of said vacuum system into at least one subsequent vacuum stage in said vacuum system while said ions are in said electrode ion pipe; and (e) transferring said ions through said electrode ion pipe and into said mass spectrometer and detector for mass analysis of said ions.

49. A method according to claim 48, wherein said step of producing said ions is accomplished at substantially atmospheric pressure.

50. A method according to claim 48, wherein said sample introduced into said ion source is a solution.

51. A method according to claim 48, wherein said electrical voltages applied to said concave electrode ion pipe comprise RP and DC components, said electrical voltages comprising RF and DC components being set to limit the m/z range of said ions which will pass through said concave electrode ion pipe.

52. A method according to claim 48, wherein said mass analysis is conducted with a quadrupole mass analyzer.

53. A method according to claim 48, wherein said mass analysis is conducted with a Time-of-Flight mass analyzer.

54. An apparatus for analyzing chemical species, comprising:

(a) an ion source for operation at substantially atmospheric pressure to produce ions from a sample;

(b) at least two vacuum stages, the first vacuum stage of said vacuum stages being in communication with said ion source such that said ions produced by said ion source can move out of said ion source and into said first vacuum stage, said vacuum stages being in communication with each other such that said ions can move through a sequence of said vacuum stages;

(c) a mass analyzer and detector located in at least one of said vacuum stages;

(d) a concave electrode ion pipe designed for restricting gas flow and having a plurality of electrodes, said concave electrode ion pipe being located in a plurality of said vacuum stages such that said ion pipe begins in one of said vacuum stages and extends into at least one subsequent vacuum stage in said sequence of vacuum stages, wherein gas flow through said ion pipe is limited without compromising ion transmission; and (e) a power supply for applying electrical voltages to said electrodes of said concave electrode ion pipe.

55. An apparatus for analyzing chemical species, comprising:

(a) an ion source for operation at substantially atmospheric pressure to produce ions from a sample;

(b) at least two vacuum stages, the first vacuum stage of said vacuum stages being in communication with said ion source such that said ions produced by said ion source can move out of said ion source and into said first vacuum stage, said vacuum stages being in communication with each other such that said ions can move through a sequence of said vacuum stages;

(c) a Time-of-Flight mass analyzer and detector located in at least one of said vacuum stages;

(d) at least one concave electrode ion pipe designed for restricting gas flow and having a plurality of electrodes, said concave electrode ion pipe being located in at least one of said vacuum stages, wherein gas flow through said ion pipe is limited without compromising ion transmission; and (e) a power supply for applying electrical voltages to said electrodes of said concave electrode ion pipe.

56. An apparatus for analyzing chemical species, comprising:

(a) an ion source for operation at substantially atmospheric pressure to produce ions from a sample;

(b) at least two vacuum stages, the first vacuum stage of said vacuum stages being in communication with said ion source such that said ions produced by said ion source can move out of said ion source and into said first vacuum stage, said vacuum stages being in communication with each other such that said ions can move through a sequence of said vacuum stages;

(c) a mass analyzer and detector located in at least one of said vacuum stages;

(d) an electrode ion pipe for restricting gas flow and having a central longitudinal axis and a plurality of electrodes extending along said axis, each of said electrodes having a concave surface facing said axis, said electrode ion pipe being located in a plurality of said vacuum stages such that said ion pipe begins in one of said vacuum stages and extends into at least one subsequent vacuum stage in said sequence of vacuum stages, wherein gas flow through said ion pipe is limited without compromising ion transmission; and (e) a power supply for applying electrical voltages to said electrodes of said electrode ion pipe.

57. An apparatus for analyzing chemical species, comprising:

(a) an ion source for operation at substantially atmospheric pressure to produce ions from a sample;

(b) at least two vacuum stages, the first vacuum stage of said vacuum stages being in communication with said ion source such that said ions produced by said ion source can move out of said ion source and into said first vacuum stage, said vacuum stages being in communication with each other such that said ions can move through a sequence of said vacuum stages;

(c) a Time-of-Flight mass analyzer and detector each located in at least one of said vacuum stages;

(d) at least one electrode ion pipe for restricting gas flow and having a central longitudinal axis and a plurality of electrodes extending along said axis, each of said electrodes having a concave surface facing said axis, said electrode ion pipe being located in at least one of said vacuum stages, wherein gas flow through said ion pipe is limited without compromising ion transmission; and (e) a power supply for applying electrical voltages to said electrodes of said electrode ion pipe.

* * * * *